(12) United States Patent
Lemberg

(10) Patent No.: US 6,688,136 B1
(45) Date of Patent: Feb. 10, 2004

(54) GENERATOR SYSTEM INCLUDING AN ELECTRIC GENERATOR AND A CENTRIFUGAL CHILLER

(75) Inventor: Alexander Abram Lemberg, Alpharetta, GA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/305,183

(22) Filed: Nov. 27, 2002

(51) Int. Cl.$^7$ ............................. F25B 31/00; H02K 9/00

(52) U.S. Cl. ............................. 62/505; 310/53; 62/434

(58) Field of Search ..................... 62/505, 430, 238.3; 310/52, 53, 54

(56) References Cited

U.S. PATENT DOCUMENTS

| 3,189,769 | A | | 6/1965 | Willyoung | |
|---|---|---|---|---|---|
| 3,796,045 | A | * | 3/1974 | Foster-Pegg | .................. 60/772 |
| 6,330,809 | B1 | * | 12/2001 | Boardman et al. | ............. 62/434 |

OTHER PUBLICATIONS

Koning, "The Cooling of Electric Machines and Cables," Zuid–Nederlandsche drukkerij N.V., Holland (1957) (the entire book is being submitted herewith).

* cited by examiner

Primary Examiner—Chen Wen Jiang
(74) Attorney, Agent, or Firm—Nixon & Vanderhye PC

(57) ABSTRACT

A cooling system for an electric generator involves connecting a centrifugal chiller to the electric generator. The centrifugal chiller circulates a refrigerant throughout the hot spots of the electric generator.

12 Claims, 4 Drawing Sheets

GENERATOR SYSTEM INCLUDING AN ELECTRIC GENERATOR AND A CENTRIFUGAL CHILLER

FIELD OF THE INVENTION

The present invention combines a centrifugal chiller, used as a compressor/condenser with the electric power generator into a single system, thereby applying a refrigerant liquid/vapor as an evaporative cooling medium for the generator components. This method will provide the inner cooling of the stator winding by liquid refrigerant flowing through the hollow conductors and effective evaporative cooling of the generator core-end regions by expansion of the liquid refrigerant into the critically heated areas.

BACKGROUND OF THE INVENTION

The use of evaporative cooling in an electrical generator is not a new concept, water has been tried as refrigerant. Prior publications have described the inner evaporative cooling of the stator and rotor conductors with water. Reference: "The Cooling of Electric Machines and Cables" by Theodore D Koning, 1957, Zuid-Nederlandsche drukkerij N. V. Holland; U.S. Pat. No. 3,189,769, entitled "Dynamoelectric Machine Rotor Cooling" issued to D. Willyoung.

SUMMARY OF THE INVENTION

The invention provides for the use of a low-pressure, low-density centrifugal chiller type refrigerant for cooling of the generator components.

Achieving a high power density in the generator is limited, in a large part, by excessive heating of the critically loaded generator components, such as core-end regions. More effective cooling of the core ends may allow for increasing the unit power rating, thereby resulting in more powerful generators.

The same thermal limitation is imposed on the end portion of the field winding. More effective cooling may also reduce the operating temperature of these components, thereby allowing for a higher field current rating.

Water-cooled stator windings may deteriorate over time due to copper crevice-corrosion. Eliminating the water and substituting it with a non-corrosive refrigerant medium also results in better cooling.

The invention allows for a higher unit power rating of the generator by effecting a radical evaporative cooling to the most critically heated generator components (such as core ends), yet utilizing the well known design—liquid cooled stator winding, gas cooled rotor.

The evaporative cooling of the generator components will be made possible through use of the hollow stator winding conductor as a capillary-and-evaporator, which would allow introduction of the cold vapor discharge to the hot spots of the generator—the core ends and the field end-winding.

Sub-cooled liquid refrigerant at approximately 70 psig and 45–55° C. temperature enters the hollow strands at the sub-cooling temperature through a circular tube supply header. Refrigerant continues flowing through the hollow bar strands which serve as the pressure risers.

Strand window dimensions, refrigerant properties and pressure are selected such, that location of the "bubble point" is near to ¾ of the core length. Liquid refrigerant, which is fed from the supply headers on both ends of the generator, enters selected hollow strands of each bar from the both ends. Each bar clip is designed for two flows—in and out. Such an arrangement ensures uniform cooling of all sections of the bar.

Refrigerant begins partially evaporating approximately from ½ of the core length and continues to the exit at the end arm. Cold refrigerant vapor at approximately 30° C. psig and 5° C. temperature exits through the exit header nozzles directed towards the core end. Nozzles can be installed on the small tubes, which would be directed to the particular generator spots of the core, step iron, stator core ventilation ducts, rotor centering ring, etc.

The cooling arrangement for the field winding is the same, so the same generator technology and design can be used. Due to a higher heat absorption the heat load, field winding current can be higher, than with hydrogen gas cooling. Evaporative cooling applies only to the stator winding and core which retain essentially the same design.

Accordingly, the invention provides the following benefits.

New effective cooling will allow for a higher unit power of the generator

Potential for copper winding crevice corrosion will be eliminated

Utilization of the existing liquid cooled winding design and technology

No hydrogen related problems, expenses, explosion danger.

DETAILED DESCRIPTION OF THE INVENTION 5.1 Implementation

Figure 1:
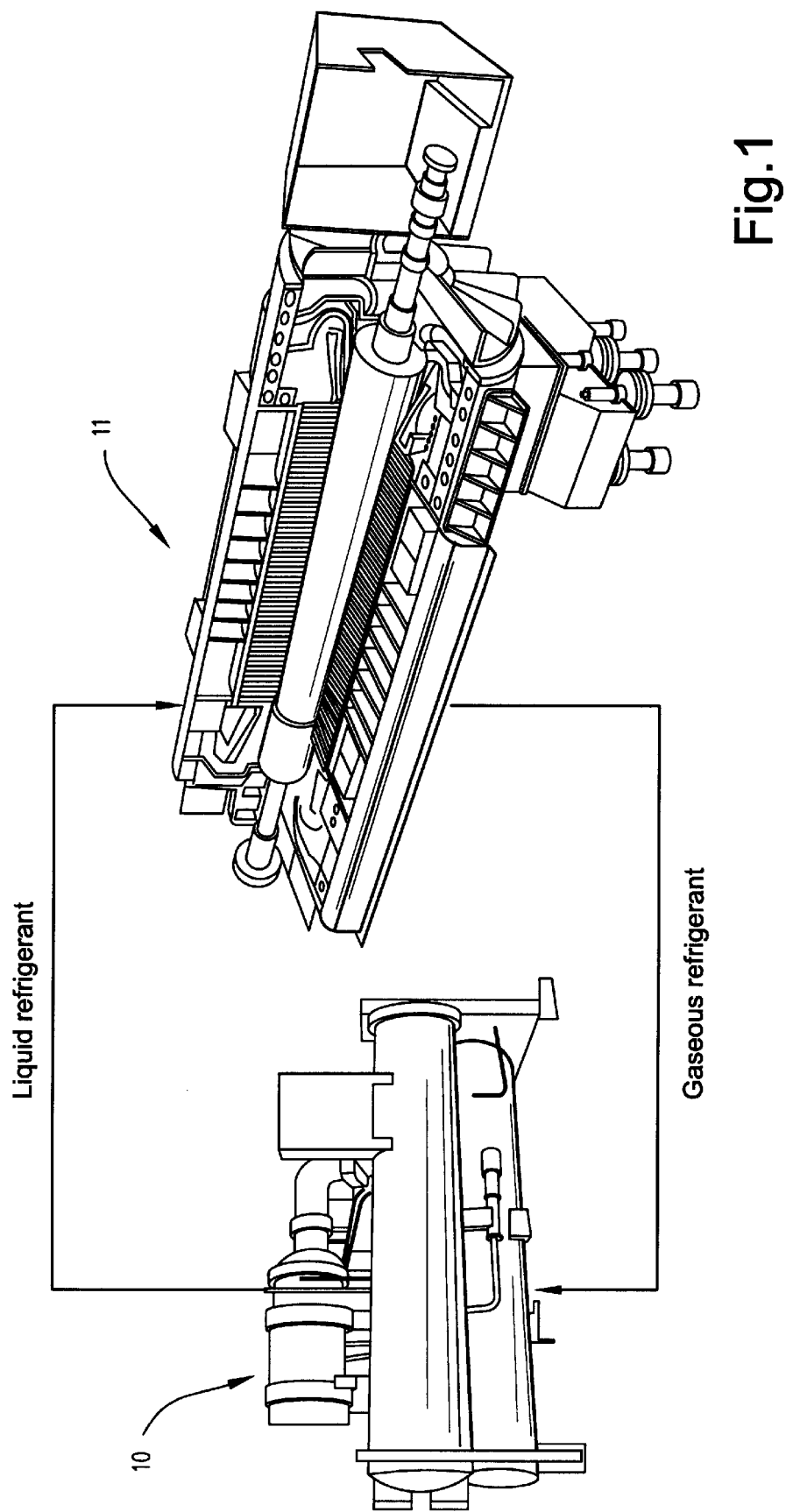
FIG. 1 schematically shows the combination of a centrifugal chiller with an electric generator.
Figure 2:
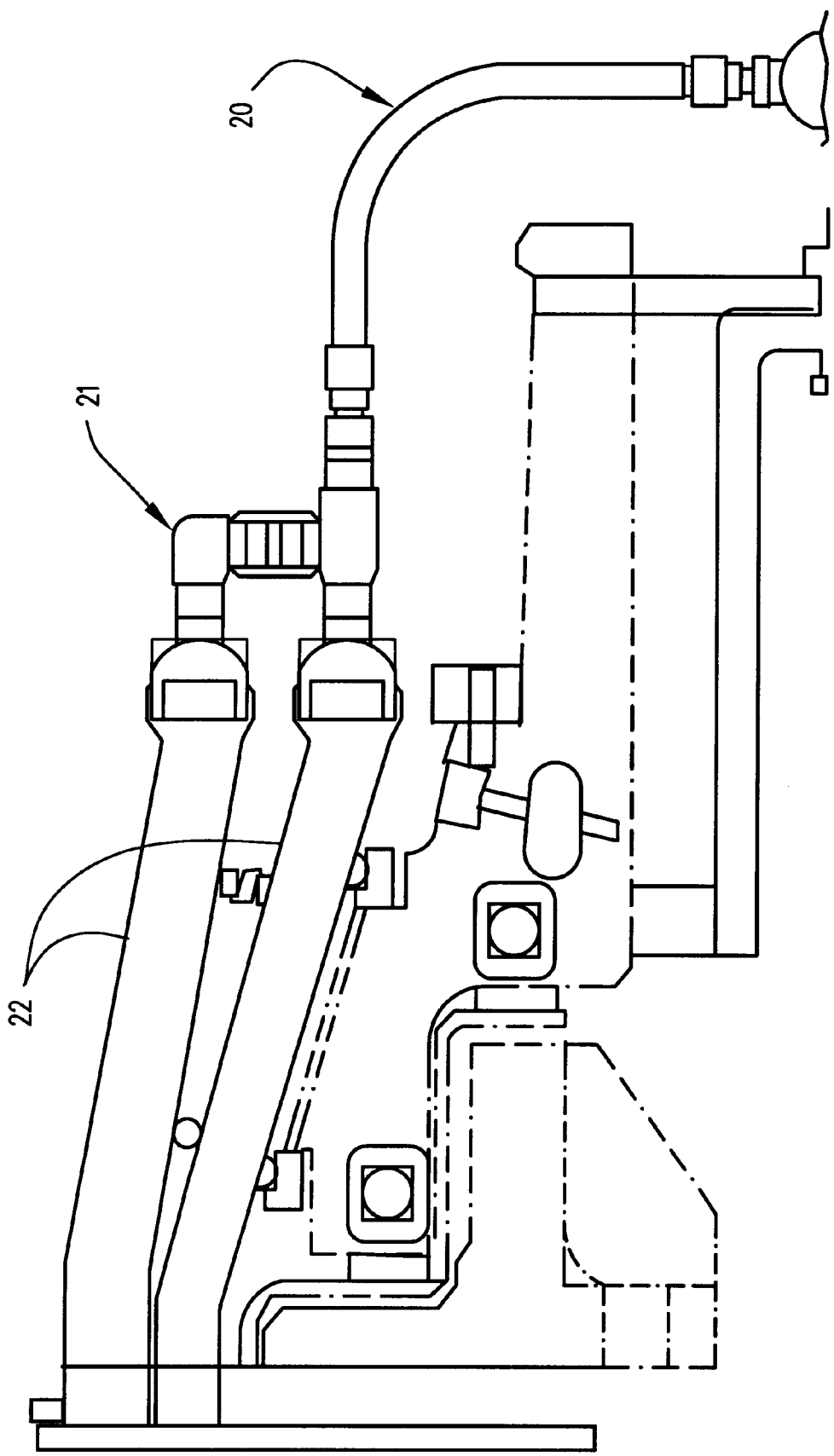
FIG. 2 shows the piping connecting the supply header with the stator bars in the slot.

As shown in FIG. 1, Centrifugal chiller 10 supplies liquid refrigerant to generator 11. As shown in FIG. 2, centrifugal chiller 10 includes the cooler. The cooler de-superheats, condenses, and sub-cools the refrigerant and sends it back to the generator inner feeding header rings (not shown) on both sides of the generator, after passing a double filtering arrangement (not shown). The refrigerant in its liquid phase enters the stator bar 22 via hollow bar strands 31,41 and through the piping 20 and fittings 21.

Figure 4:
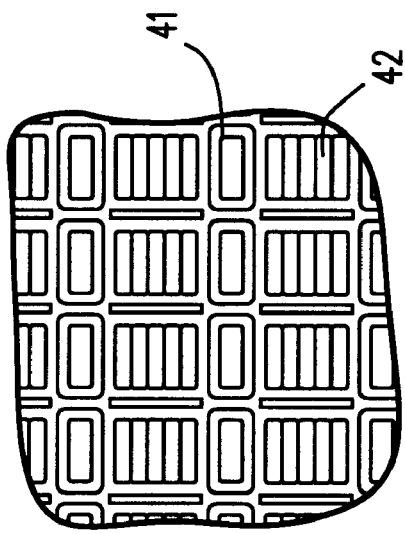
FIG. 4 shows another stator bar in cross-section with hollow and solid strands.
Figure 3:
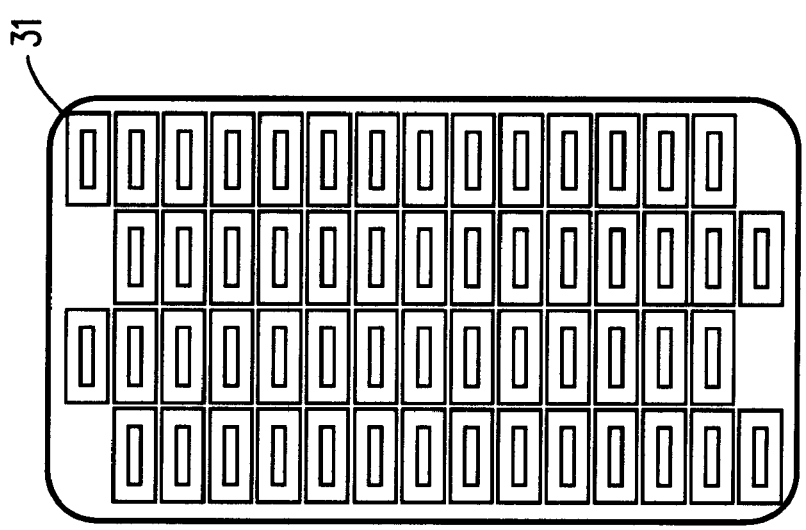
FIG. 3 shows a stator bar in cross-section with hollow strands.

FIGS. 3 and 4 show enlarged cross-sections of alternative stator bars 22. In FIG. 3 all of the bar strands 31 are hollow, while FIG. 4 shows a combination of hollow bar strands 41 and solid bar strands 42.

As will be recognized by those skilled in the art special consideration should be given to the oil carryover. Oil from the bearings, seals, and compressor will be captured and carried over with the liquid refrigerant. Stator bar strand dimensions have to account for certain oil content. Also field end winding grooves must be of a large enough size to allow for the oil exits.

5.2 Temperature Control

Cooling load change in this case is expressed as a change in the stator current. So, the stator current is the main parameter that drives the coolant pressure and flow. The objective here is to achieve specified axial location of the "bubble point" in the strand. The feedback loop contains a RTD (resistance temperature detector) in the slots and TC (thermocouple) readings at the refrigerant inlet and discharge.

Figure 5:
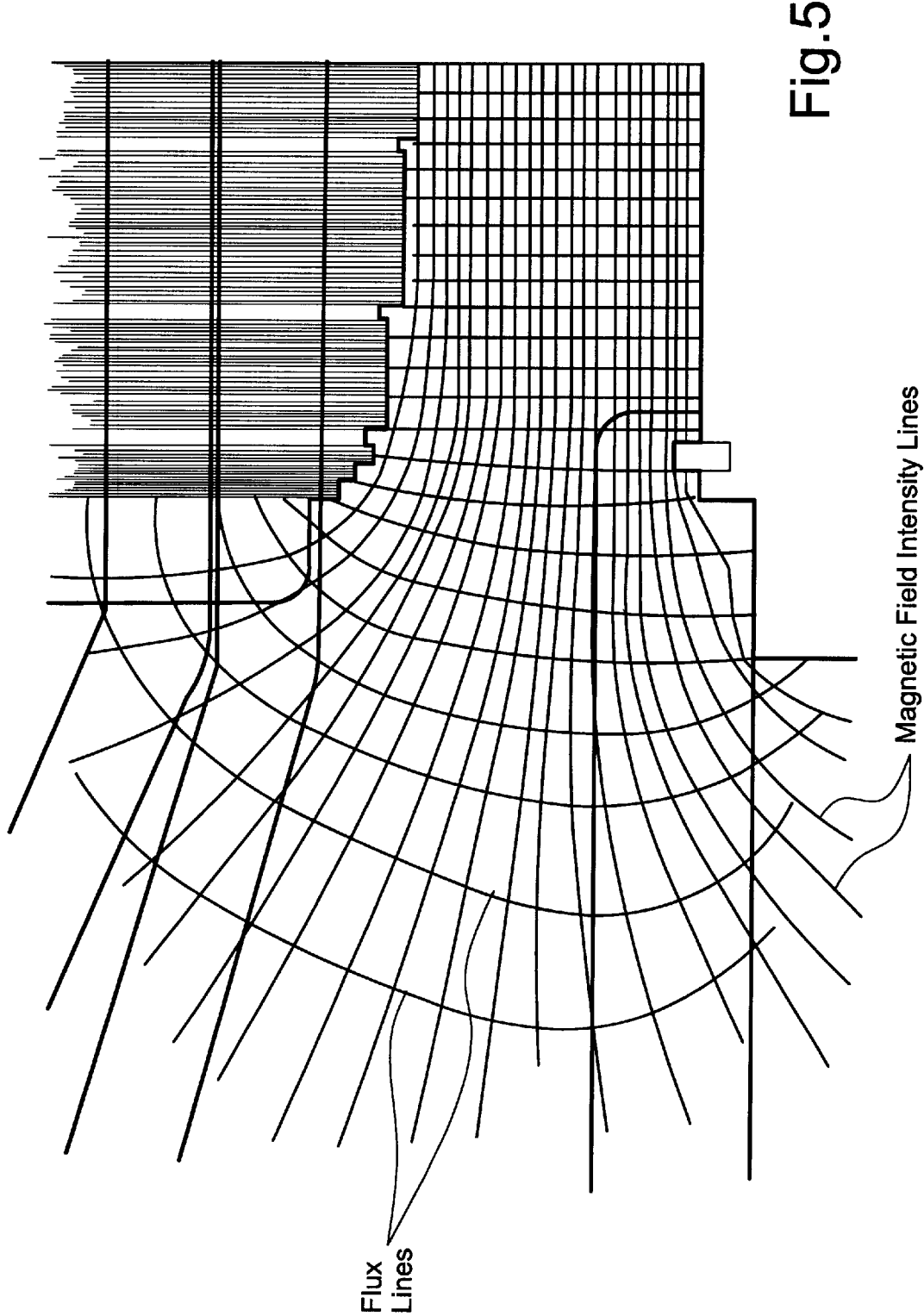
FIG. 5 schematically shows distribution of the electromagnetic field in the stator core end region.

FIG. 5 shows equal flux lines and equal potential lines at the generator core end. Overfluxing of the core can lead to local arcing between the laminations, rapidly progressing through, severe overheating, catastrophic damage of the core and other generator components. The use of forced evaporative cooling with refrigerant in the core ends solves these problems and serves to increase the unit power rating of the generator. As described above, the liquid refrigerant enters one end of the stator bar and exits into the generator space from the other end of the stator bar. Bi-directional flow of the refrigerant within one bar may be selected as a design option, when different strands are selected for opposite flows. A one-pass liquid system from both directions is utilized.

It is envisioned that due to the higher density of refrigerant vapor, the windage losses may be higher. For this reason, the invention may be most effective for 4- and 6-pole generators. (The generator shell pressure would be approximately 25–30 psig.)

The combination of a centrifugal chiller and electric generator will be heavier, noisier, and require larger installation space than conventional generators and cooling systems. The increased cost of the generator and chiller combination, however, will be outweighed by the increase in the unit power rating. Maintenance of the generator, however, should include the full scope of centrifugal chiller maintenance.

The refrigerant selected for the system should be a non-conductive, low-pressure, mid-temperature, low density, high specific heat, enthalpy refrigerant. The refrigerant should be compatible with the generator lube- and seal oil, insulation materials, hoses, etc.

All current carrying and high electric potential components should be insulated to prevent possible arcing in the mist atmosphere. This especially applies to the possible surface discharges on the stator bar and arms.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A cooling system for an electric generator, said system comprising:
    a centrifugal chiller located externally to the electric generator and connected to the electric generator for circulating a refrigerant throughout and in direct contact with hot spot areas in the electric generator.

2. A cooling system as claimed in claim 1, wherein the hot spot areas include the stator winding and core ends.

3. A cooling system as claimed in claim 1, wherein the hot spot areas include the field winding.

4. A cooling system as claimed in claim 2, wherein the hot spot areas further include the field winding.

5. A generator system for producing electricity and having an increased unit power rating, said system comprising:
    an electrical generator for generating electrical power; and
    a centrifugal chiller connected to the electric generator for circulating a refrigerant throughout hot spot areas in the electric generator.

6. A cooling system as claimed in claim 5, wherein the hot spot areas include the stator winding and core ends.

7. A cooling system as claimed in claim 5, wherein the hot spot areas include the field winding.

8. A cooling system as claimed in claim 6, wherein the hot spot areas further include the field winding.

9. A method for increasing the unit power rating of an electrical generator, said method comprising connecting the electric generator with an externally located centrifugal chiller, wherein the centrifugal chiller uses a refrigerant to directly contact and cool hot spots of the electric generator.

10. A cooling system as claimed in claim 9, wherein the hot spot areas include the stator winding and core ends.

11. A cooling system as claimed in claim 9, wherein the hot spot areas include the field winding.

12. A cooling system as claimed in claim 11, wherein the hot spot areas further include the field winding.

\* \* \* \* \*